Dec. 2, 1958     E. W. MEYER ET AL     2,862,918
ACYLATED, ISOLATED, PARTIALLY-HYDROLYZED, SOYA
PROTEIN AND PROCESS
Filed March 12, 1956
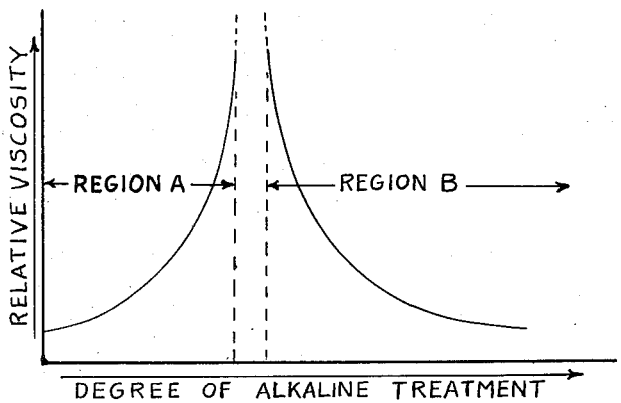
FIG. I
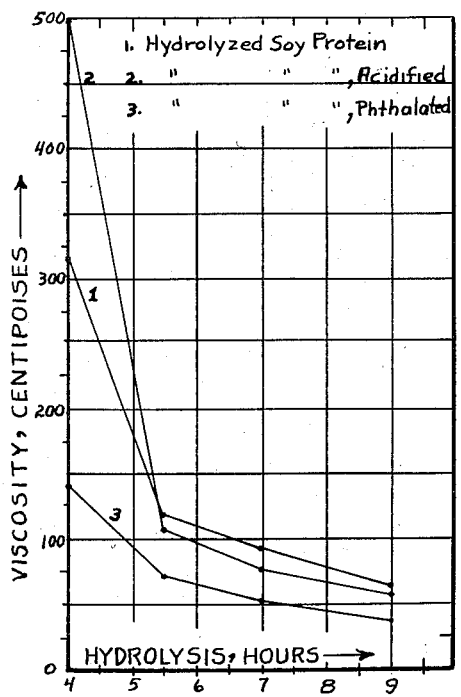
FIG. II
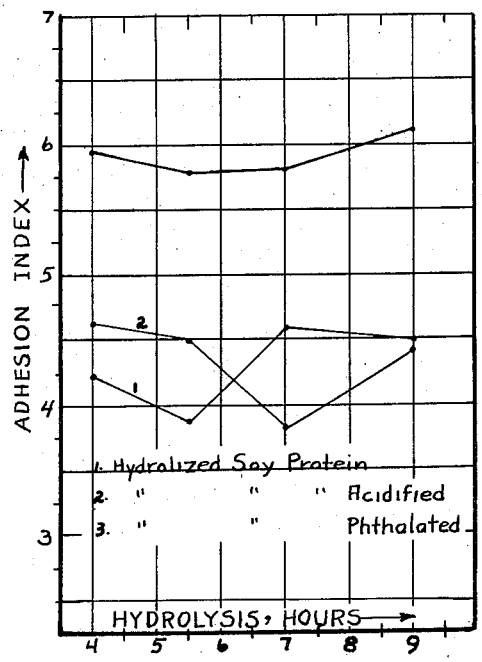
FIG. III
EDWIN W. MEYER
SIDNEY J. CIRCLE
      INVENTORS
BY *G. G. Christensen*
ATT'Y

United States Patent Office 2,862,918
Patented Dec. 2, 1958

2,862,918

ACYLATED, ISOLATED, PARTIALLY-HYDRO-
LYZED, SOYA PROTEIN AND PROCESS

Edwin W. Meyer and Sidney J. Circle, Chicago, Ill., assignors to The Glidden Company, Cleveland, Ohio, a corporation of Ohio Application March 12, 1956, Serial No. 570,970

7 Claims. (Cl. 260—123.5)

This invention relates to novel compositions of matter and more particularly it relates to acylated, isolated, hydrolyzed soybean protein compositions. Especially it relates to such acylated isolated soya protein compositions in which the isolated soybean protein has been hydrolyzed beyond the initial gel stage as hereinafter defined and then acylated, and to a novel process for preparing such compositions.

Our co-pending application, Serial No. 570,702, filed March 12, 1956, describes and claims pigmented coating compositions containing an acylated, isolated, hydrolyzed soybean protein which can be prepared according to the present invention. Said pigmented compositions are suitable for the coating of paper and other cellulosic webs. As is disclosed in the aforesaid co-pending application, the acylated protein products confer improved adhesiveness of the coating to the web and in the case of acylated, isolated, hydrolyzed, soya protein also confer greater fluidity to the coating colors. The present invention describes a process of acylating isolated, hydrolyzed, soybean protein thereby to obtain a product whose alkaline dispersion is characterized by greater fluidity, and also describes and claims the acylated proteins resulting from such a process.

It is therefore an object of this invention to provide a novel process for preparing acylated, isolated, hydrolyzed, soybean protein which can be dispersed in aqueous alkaline solutions to give dispersions characterized by enhanced fluidity.

It is another object to provide novel acylated soybean protein compositions of the character described last above.

These and other objects of our invention will be apparent from the following description amplified by the figures of drawings appended hereto in which:

Fig. I is a graphical representation of the relation between viscosity and degree of alkaline treatment of isolated soybean protein;

Fig. II is a graphical representation of the relationship between viscosity of pigmented coating compositions containing modified and unmodified hydrolyzed soybean proteins and the degree of alkaline treatment (indicated by time, in hours, of the alkaline hydrolysis) of the modified and unmodified proteins;

Fig. III is a graphical representation indicating the relation between the "adhesion index" of pigmented coating compositions containing modified and unmodified proteins and the degree of alkaline treatment (indicated as in Fig. II).

The isolated, hydrolyzed soybean protein which can be treated in accordance with the process of the present invention is a purified soybean protein in the sense that it has undergone a refining process designed to remove substantially all of the oil, sugars, fibrous material and other components originally present along with the proteinaceous material in the soya bean. In its isolated state, the soybean protein is characterized by being essentially an alkali-soluble, acid-precipitable composition. The isolation and alkaline hydrolysis of such proteinaceous starting material for our invention can be accomplished by any of a variety of well-known procedures. Such procedures form no part of the present invention. Accordingly, discussion of this portion of the prior art seems unnecessary beyond calling attention to representative patents which indicate the variety of preparative procedures available to those skilled in the art to obtain the starting material for our novel process. Such patents include U. S. Patents 1,955,375, 2,233,439, 2,238,329, 2,246,466, 2,304,099 and 2,588,392. The disclosures of these patents with respect to the isolation and alkaline hydrolysis of soybean protein are here incorporated by reference.

As has been suggested hereinabove, hydrolysis of isolated soybean protein is a well known procedure and is disclosed in numerous variations in the prior art including some of the above mentioned patents. The alkaline treatment of isolated soybean protein has been the subject of considerable study and has shown that upon subjecting isolated soybean protein to an alkaline treatment with any of a variety of alkaline reagents the globulins pass through a series of transformations, the exact nature of which is not completely understood. However, the changes which occur on continuing the alkaline treatment can be followed by observing the viscosity characteristics of the dispersed protein. As described in U. S. Patent 2,381,407, page 1, col. 2, line 40 ff, and represented graphically in Fig. I appended hereto, the viscosity of the hydrolyzing soybean protein sol[1] initially increases until a gel state has been reached. This is indicated by a maximum viscosity and in Fig. I by the region A. Upon continuing the alkaline treatment, denaturation and hydrolysis apparently continues and the gel phase disappears. This is indicated by a rapid drop in viscosity which, upon continuation of the alkaline treatment approaches a minimum viscosity value. The area, region B of Fig. I represents hydrolyzed soya protein which has passed through the gel stage. The ultimate point of region B is that stage wherein most of the peptide bonds originally present in the protein molecule have been severed. Fig. I is an idealized representation of this phenomenon. The character, form and details of the curves and data indicated thereon will be different from each alkaline treatment of soybean protein which is carried out at a specific temperature, time, concentration of alkali, and concentration of soybean protein. Even soybean protein derived from different varieties of soya beans will give different data. However, the general character of the data will be consistent in every instance and this fact permits us to idealize the data and thereby to derive the graphical representation of Fig. I.

For the purposes of our invention, we have determined that the aforementioned advantages of increased fluidity can be obtained only by acylation in accordance with our novel process of an isolated soya protein which has been hydrolyzed beyond the initial gel stage, i. e., an isolated hydrolyzed soya protein which falls within the region B of Fig. I.

In accordance with our invention, therefore, we have found that by acylation of an isolated soya protein which has been hydrolyzed beyond the initial gel stage, acylated isolated hydrolyzed soya protein compositions are obtained which are characterized by increased fluidity of their alkaline dispersions, compared to the fluidity of the unacylated isolated hydrolyzed soya protein. These acylated protein compositions of our invention are characterized also by increased utility as adhesives and as components of synthetic fiber spinning compositions.

[1] As indicated by extracting samples of the alkaline dispersion, isolating the protein therefrom in dry form and determining the viscosity of an 8% protein caustic alkali dispersion of said isolated protein at 160° F. by known procedures.

In carrying out the process of our invention an alkaline protein dispersion, preferably at pH of at least 8 and containing about 2% protein concentration by weight, is treated with at least about 2% by weight on the protein of a carboxylic acid anhydride. The reaction mixture is maintained alkaline, i. e., above about pH 8, if necessary by the addition of an alkali, such as a 10% aqueous sodium hydroxide solution. Any carboxylic acid anhydride or mixtures of such can be used and in amounts which produce significant acylation of the protein. We have found that in general at least about 2% of the anhydride is required although we prefer to use above about 5% by weight; and especially 10% by weight of anhydride (based on the protein) is advantageously used. One skilled in the art will, of course, have no difficulty in determining the optimum amount of a specific anhydride which will be required to produce optimum results on a specifically prepared isolated hydrolyzed soya protein.

Although any carboxylic acid anhydrides or mixtures thereof are contemplated by our invention, we prefer to use dicarboxylic acid anhydrides and especially $\alpha,\beta$-dicarboxylic acid anhydrides. Examples of the several varieties of anhydrides which have been found satisfactory for use in our invention are listed below:

Mono carboxylic anhydrides:
   Acetic anhydride
   Propionic anhydride
   Benzoic acid anhydride
Dicarboxylic acid anhydrides:
   Glutaric acid anhydride
   Naphthalic acid anhydride
$\alpha,\beta$-Dicarboxylic anhydrides:
   Succinic anhydride
   Dodecenyl succinic anhydride
   Maleic anhydride
   Dichloromaleic anhydride
   Phthalic anhydride
   Tetrahydrophthalic anhydride
   Hexahydrophthalic anhydride
   Tetrachlorophthalic anhydride
   Nitrophthalic anhydride Examples of the alkaline reagents which have been found suitable for dispersing the isolated, hydrolyzed soybean protein and for maintaining the dispersion in alkaline condition during acylation include the alkaline metal hydroxides, such as sodium and potassium hydroxide, the alkaline earth metal hydroxides, such as calcium, barium and strontium hydroxides, the alkali metal carbonates, such as sodium carbonate, the quaternary ammonium hydroxides, such as trimethylbenzylammonium hydroxide, and mixtures of these can be used. Preferably sodium hydroxide is used to disperse the protein initially and to maintain the dispersion alkaline during the acylation.

The carboxylic acid anhydride can be added to the alkaline protein dispersion in any suitable and convenient manner. Preferably the solid anhydrides are added in finely-divided form or such that on contact with the alkaline mass it is rendered finely divided. Thus, the anhydride can be added as a fine grind, in the molten state, or as a solution in a non-reactive solvent. Liquid anhydrides, such as acetic anhydride, of course, can be added directly. Mixtures of anhydrides, especially those which form low melting eutectic mixtures can be used, often with advantage.

In the preferred embodiment of the process of our invention, the isolation, hydrolysis and acylation of the soybean protein are combined. Thus, substantially oil-free flakes are extracted in a known manner and the aqueous extract of isolated protein is subjected to an alkaline hydrolytic treatment in a manner also known to the art. Prior to completion of the predetermined time of the alkaline hydrolysis, but after a period sufficient to insure that the initial gel stage has been traversed and that the protein dispersion lies within the region B of Fig. I, acylation with an $\alpha,\beta$-dicarboxylic acid anhydride is effected, e. g., by addition of a dilute acetone solution of phthalic acid anhydride. The alkaline hydrolysis is completed simultaneously with the acylation step, care being exercised to maintain the reaction mixture sufficiently alkaline. The time required for acylation will usually depend on the size of the batch and the temperature at which the alkaline hydrolysis is conducted, as well as on the acylating agent.

After acylation has been effected and the desired period of hydrolysis has been completed, the modified, i. e., acylated, protein is isolated by the addition of acid to the aqueous dispersion to bring the pH of the latter within the precipitation range of the modified protein. Thereafter, the precipitated protein is settled, the whey decanted, and the curd centrifuged or otherwise freed of excess whey. The recovered modified protein can then, if desired, be washed, filtered, pressed, or otherwise dewatered and then dried. These latter steps are carried out in the conventional manner in this art and are of no material significance in the present invention. They can be varied or replaced with other steps as desired, which are effective to give a modified protein which can be stored, ground, shipped or used directly in the preparation of coatings, adhesives, spinning solutions and the like.

The following examples illustrate the principles of our invention and include the best modes presently known to us for practicing these principles.

EXAMPLE 1

*Preparation of acylated protein*

Soybeans were extracted in a known way, which constitutes no part of our invention, with an organic solvent to remove substantially all of the oil therein. One hundred parts (by weight) of the extracted residue, in the form of flakes, were agitated for 1.5 hours with a suspension of 2.5 parts of lime and 1400 parts of water at 80° F. The resulting slurry was filtered over screens to recover 1200 parts of lime liquor. The spent flakes were reslurried in a mixture of 1150 parts of water and 2 parts of sodium hydroxide at 120° F. for ten minutes. This slurry was separated by screening into 950 parts of caustic liquor and a residue of spent flakes. The latter were washed by reslurrying in 1200 parts of water at 145° F., and the slurry was filtered over screens to yield a wash liquor and washed spent flakes. These were pressed to give an additional 100 parts of wash liquor. All of the wash liquor (1300 parts) was added to the lime liquor, and the combined mass was rendered acid to a pH of 4.6 by the addition of sulfur dioxide. The precipitate which formed was allowed to settle, and the supernatant whey was decanted from the curd (550 parts). The wet curd was reslurried in the 950 parts of caustic liquor, identified above, and to this slurry was added 3.4 parts of lime and 4.8 parts of soda ash. The mixture, containing about 33 parts of protein, was heated and agitated at 120° F. for 6 hours, during which period it was clarified by centrifuging. A solution of 4.125 parts of phthalic acid anhydride dissolved in 200 parts (by volume of acetone was added dropwise to the hot protein solution during a period of about 25 minutes. During this addition, the pH of the mixture was maintained at 9.5, as closely as feasible by the dropwise addition of 10% aqueous caustic soda. The reaction mixture was agitated for about 35 minutes thereafter to complete a seven-hour hydrolysis period.

The mass was then rendered acid to a pH of 4.2 to 4.4 by the addition of sulfur dioxide. The resultant slurry was permitted to settle for about 16 hours and then after the whey had been decanted the curd was pressed to a cake, granulated and then dried at 140° F.

In similar manners, acylated isolated soya proteins are prepared using in place of phthalic acid anhydride an equal weight of maleic acid anhydride or of succinic acid anhydride.

In another treatment, the dibasic acid anhydride was added to the alkaline protein solution as a finely ground powder instead of as a solution in acetone, over a period of about 20 minutes. In this manner, acylated protein of comparable properties was obtained.

In such instance, the acylated protein material when used as a component of a paper coating composition gave coatings which were superior in respect to adhesion as compared to similar coatings prepared by using "Alpha" protein, and were approximately equal to the adhesion of coatings prepared using "Sheffield" casein.

*Preparation of coating composition and coated paper*

The acylated protein mass prepared as described in Example 1 above was tested in paper coating compositions as follows:

The protein mass was thoroughly wetted out in water by mixing 50 grams of the protein in 200 grams of water for five minutes, at about 75° F. Thereafter, a solution containing 1 gram 28% aqua ammonia was added and followed with 6 grams of sodium carbonate. Then 50 grams of water was added to the protein dispersion and the mixture was heated to and maintained at 135° to 140° F. for 45 minutes. To 150 grams of the "clear," a slurry of 200 grams of "HT" Clay (commercial coating clay of medium size, product of Minerals and Chemicals Corp. of America, Edgar Div.) in 212 grams of water was added, and the mixture was agitated until uniformly blended.

The viscosity at 90° F. of a 40% solids coating mixture was determined with a Brookfield viscosimeter at 30 R. P. M. and 60 R. P. M.

The coating composition was applied to three commercial grades of paper using a Meyer Rod No. 22. The sheets of coated base stock were dried, calendered and conditioned at 73° F., 50% pH for about 3 hours (see TAPPI Standard T402m) before subjecting them to the wax test for surface strength of paper (see Tappi Standard T459m–45).

An "Alpha" protein control was prepared in accordance with Example 1 and is shown in the following table for comparison purposes.

In similar manner coating compositions were prepared using various acylated soya proteins indicated below. The acrylating treatment was conducted in the manner described in Example 1, using the amounts of acid anhydrides indicated in the table in percent by weight on the protein. The protein, unless otherwise indicated, was "Alpha" protein, an isolated, hydrolyzed soya protein prepared commercially by The Glidden Company.

| Run | Protein | Anhydride | Percent | Viscosity of 40% solids coating at 90° F. | |
|---|---|---|---|---|---|
| | | | | 30 R. P. M. | 60 R. P. M. |
| A | Ex. 1 | Phthalic | 12.5 | | |
| B | "Alpha" | None | | 450 | 314 |
| C | do | Phthalic | 10 | 170 | 135 |
| D | do | Maleic | 10 | 78 | 72 |
| E | do | Succinic | 10 | 150 | 124 |
| F | do | TCP [1] | 15 | 165 | 142 |
| G | do | F. G. PAA [2] | 10 | 200 | 149 |
| H | do | FL. PAA [3] | 10 | 220 | 148 |
| J | do | THP [4] | 10 | 340 | 230 |
| K | do | NA [5] | 10 | 270 | 132 |
| L | do | None | | 300 | 192 |

[1] Represents tetrachlorophthalic acid anhydride.
[2] Represents phthalic acid anhydride ground to −40 mesh and added in a dry state.
[3] Represents phthalic acid anhydride (commercial grade) in a flaked condition and added dry.
[4] Represents tetrahydrophthalic acid anhydride.
[5] Represents endo-bis-bicyclo(2,2,1)-β-hoptene,2,3-dicarboxylic anhydride, commercially known as Nadic anhydride (a product of National Aniline Div. A. C. & D.

In runs A–E, inclusive, the protein was "cut" with 2% $NH_4OH$ (28% strength) plus 12% $Na_2CO_3$ by weight on protein. In runs F–L, inclusive, the protein was "cut" with 2% $NH_4OH$ (28% strength) plus 15% $Na_2CO_3$ by weight on protein.

EXAMPLE 2

*Acetic anhydride acylation*

An isolated soybean protein alkaline dispersion containing about 2% by weight of protein equal to about 1500 parts by weight of protein which had been hydrolyzed to beyond the initial gel stage was prepared as described in Example 1, with the single exception that agitation at 120° F. was permitted to continue for 5 hours, instead of 6 as in Example 1. At this point in the alkaline treatment, to the protein liquor, the pH of which was 11.4, was added during about 1 hour, 180 parts (or 12% by weight on the protein) of acetic anhydride. The alkaline treatment at 120° F. was continued for 1 hour thereafter, at which time the pH of the mass was 8.5. The product of this acylation reaction was precipitated by rendering the mass acid to pH 4.1 with gaseous sulfur dioxide and the precipitated product was isolated in the usual manner. As a control, a portion of the alkaline liquor prior to acylation was separated from the batch and after 6 hours of treatment at 120° F. was precipitated at pH 4.5 and the unacylated product isolated in the same manner as the acylated protein.

The characteristics of the acetylated protein were compared to those of the control as tabulated below.

| | Percent moisture | Percent protein, dry | Viscosity,[1] second |
|---|---|---|---|
| Acylated protein | 7.43 | 98.5 | 41.8 |
| Control | 8.86 | 99.6 | 44.5 |

[1] Viscosity is that of a sodium carbonate "cut" which was prepared as follows:
10 grams of the protein adjusted to 95% moisture was suspended in 50 ml. of water and permitted to stand for 10 minutes and then placed in a water bath at 150° F. for 10 minutes. The suspension was agitated and 10 ml. of 10% aqueous sodium carbonate was added. The mixture was thereafter held in the water bath for twenty minutes, stirring the "cut" occasionally. Next, 20 ml. of hot (160° F.) water was added and the mixture held at 160° F. for 10 minutes. It was then permitted to cool to room temperature (75° F.) and adjusted to 90.8 g. by the addition of water. The dispersion was cooled to 20° C. and the time, in seconds, for a measured volume to flow from a 50 ml. pipette was determined as the viscosity.

The adhesion of pigmented paper coatings prepared with those proteins was determined and indicated that the acylated protein composition was superior in this respect to the analogous compositions containing the unacylated protein control.

Similar acylated proteins were prepared in analogous fashion in which an equal weight of a mixture of acetic acid propionic anhydrides was used.

EXAMPLE 3

In order to study the effect of length of alkaline treatment upon both modified and unmodified soybean protein the following experiment was undertaken:

By a procedure analogous to that described in Example 1 above, soybean protein was isolated from 5000 grams of oil-free soybean flakes to the initial curd stage. This curd, in the amount of 24 liters, was diluted to 72 liters with water and the slurry was heated to 120° F. At five minute intervals, 84 grams of lime, 150 grams of caustic soda and 120 grams of soda ash were added to the slurry. The mixture was agitated for 1 hour at about 120° F. and then centrifuged, holding the slurry and centrifugate at about 120° F. There was obtained sixty liters of clarified liquor. This was divided into six equal portions, each portion being treated as indicated in the following table:

| Portion | Time of alkaline treatment, hours | Treatment 1 hour before precipitation | pH of liquor Initial | pH of liquor Final | pH of liquor Ppt. |
|---|---|---|---|---|---|
| A | 4 | None. (Control) | 11.8 | 11.8 | 4.4 |
| B | 4 | Acidified to pH 9.55 with HCl | 11.8 | 9.5 | 4.4 |
| C | 4 | 25 g. fine grind PAA added | 11.8 | 9.5 | 4.4 |
| D | 5.5 | None. (Control) | 11.8 | 11.8 | 4.4 |
| E | 5.5 | Acidified to pH 10.0 with SO₂ acid then to pH 9.55 with HCl | 11.8 | 9.5 | 4.4 |
| F | 5.5 | 25 g. fine grind PAA added | 11.8 | 9.5 | 4. |

In a similar manner an additional 60 liters of alkaline liquor was prepared and 10 liter portions of this were treated as shown below:

| Portion | Time of alkaline treatment, hours | Treatment 1 hour before precipitation | pH of liquor Initial | pH of liquor Final | pH of liquor Ppt. |
|---|---|---|---|---|---|
| G | 7 | None. (Control) | 11.7 | 11.7 | 4.4 |
| H | 7 | Acidified to pH 9.5 with HCl | 11.7 | 9.5 | 4.4 |
| I | 7 | 25 g. fine grind PAA added | 11.7 | 11.7 | 4.4 |
| J | 9 | None. (Control) | 11.7 | 11.7 | 4.4 |
| K | 9 | Acidified to pH 9.5 with HCl | 11.7 | 9.5 | 4.4 |
| L | 9 | 25 g. fine grind PAA added | 11.7 | 9.5 | 4.4 |

The alkaline treatment, precipitation and isolation were carried out in the usual manner except as noted above. The precipitated proteins were allowed to settle overnight, bagged, pressed, granulated and dried at 150° F. in each instance. After moisture equilibration, the dried products were ground to 40 mesh.

The viscosity characteristic of each of the above proteins was determined by examination of the sodium carbonate dispersions prepared as described in Example 2 above.

Portion: Viscosity (in seconds)
Distilled water _____ 21.5
B _____ 49.2
C _____ 47.2
E _____ 37.4
F _____ 37.4
H _____ 37.8
I _____ 36.6
K _____ 35.1
L _____ 34.1

For obvious reasons the character of the acidified unacylated proteins represents a finer control against which the acylated protein should be compared, particularly because the extent of alkaline treatment is more comparable at the same pH. For this reason the viscosity characteristics of the unacidified control (portions A, D, etc.) are not included hereinabove.

Paper coating compositions were prepared as described in Example 1 above with each of the above prepared acylated, isolated, hydrolyzed, soybean protein compositions. In each instance the viscosity of the coating color and "Adhesion index" of the paper coatings made therewith were determined. The data obtained from these tests are shown on the attached graphs, Figs. II and III, respectively.

Fig. II, which is a graphical representation of the relationship of the viscosity, as determined with a Brookfield viscosimeter at 30 R. P. M. and at 90° F. and the time, in hours, of the alkaline treatment. In each instance, the viscosity decreases as the duration of alkaline treatment increases. Under the specific conditions of this alkaline treatment, it is evident that the 4 hour period is just beyond the time required to pass through the initial gel stage, since the viscosity decreases rapidly as alkaline treatment is extended to about 5.5 hours after which time the viscosity in each instance levels off. This rapid decrease in viscosity is most noticeable with the coating colors containing unmodified soybean protein. Particularly, it should be noted from these data that at all times the viscosity of the acylated protein-containing coating color (curve 3) is significantly less than that of the unacylated protein-containing coating colors (curves 1 and 2).

Fig. III which shows graphically the relationship of the "Adhesion index" of paper coatings prepared from these coating colors containing modified and unmodified soybean protein with time, in hours, of alkaline treatment thereof. As is evident from this graph, the "Adhesion index" of acylated isolated soybean protein which has been hydrolyzed to beyond the initial gel stage is significantly better than the "Adhesion index" of unacylated similarly treated isolated soybean protein.

*Adhesion index*

The adhesive character of a paper coating composition on coating base stock was determined according to the conventional Tappi Standard T459m-45. The coating color was applied to three commercial grades of coating base stock using a Meyer Rod No. 22. The coated test sheets were dried, calendered and conditioned at 73° F., 50 R. H. for about 3 hours, as prescribed in Tappi Standard T402m.

The adhesive strength of the surface coating so prepared is determined using Standard Dennison Waxes which are rated in whole numbers. However, an experienced operator can, and usually does, distinguish gradations of scoring within the range of each standard. Thus, the practiced operator usually reports a series of "picks" with the number of the standard wax together with the qualifying rating of slightly or very slightly, better or worse. Since in our tests we have made it a practice to evaluate each coating color on three coating base stocks, we have, in order to arrive at a numerical average for the three results, arbitrarily assigned a fractional value to the intermediary, or qualifying ratings reported by the testing laboratory. These are given below:

| "Pick" value reported by operator | Arbitrary fractional value assigned |
|---|---|
| 4 | 4.0 |
| 4 vsl− | 3.9 |
| 4 sl− | 3.8 |
| 4− | 3.7 |
| 3+ | 3.4 |
| 3 sl+ | 3.3 |
| 3 vsl+ | 3.2 |

Thus the term "Adhesion index" as used herein is the arithmetical average of the arbitrarily assigned numerical values given the results reported in the "Pick Tests" by the Testing Laboratory, with a coating color on the three coating base stocks. This gives a single value, "Adhesion index," for the adhesiveness of one coating color on several types of coating base stock or permits the averaging of several "Pickings" on one type of coating base stock.

It will be readily seen from the foregoing examples that improved acylated, isolated, hydrolyzed soybean proteins have been provided, which acylated proteins are useful as the adhesive components in paper coating compositions. Our invention, however, is not to be limited to the several variations disclosed in these illustrative examples.

Thus, any carboxylic acid anhydride which will react with the amino or other reactive moiety of the protein molecule can be used. As has been indicated above, the extent of alkaline treatment which can be given the isolated protein should be at least that required to ensure passage through the initial gel stage. Due to the wide fluctuation in soybean protein compositions, this factor is difficult if not impossible to assign a numerical value, but it will be apparent to those skilled in the art of hydrolyzing isolated soybean proteins.

The processes of our invention also can be varied from those illustrated in the above examples. For example, the acylation can be carried out at any convenient temperature. Since this step is effected in alkaline media, it is obvious that the higher the temperature of acylation, the more rapid will be the denaturation, which includes hydrolysis, of the isolated soybean proteins. It is preferred that the acylation be conducted at temperatures between about 70° F. and about 130° F. The acylation can be followed by observing the pH of the reaction mass, this step being considered complete when no further drop in pH is noted. We prefer to permit the reaction mass to be agitated for a relatively short period thereafter prior to acidification in order to ensure complete reaction, or in an instance where the alkaline treatment is a concurrent step, until the completion of the predetermined time of alkaline treatment.

Acylation of proteins is old in the art. We have found, however, that the unique and surprising advantages of our invention follow only from the careful selection of the acylating conditions and the type of protein acylated. The latter must be isolated soybean protein which has been hydrolyzed to beyond the initial gel stage. Such a protein mixture when treated with a carboxylic acid anhydride under the conditions above specified reacts without substantial increase in cross-linking, as indicated by the lower viscosity characteristics of our novel products. Other acylating agents, such as dicarboxylic acid dichlorides, give modified products which are characterized by more viscous alkaline dispersions indicating substantial cross-linking of the protein molecules.

In effect, by the process of our invention, the ionic character of the protein molecule is altered by an acylation with a carboxylic acid anhydride. The free amino groups and other reactive moieties are to some effective extent replaced by carboxylic acid groups (when a dicarboxylic acid anhydride is used as the acylating agent) or by a neutral moiety (when a monocarboxylic acid anhydride is used).

Accordingly, we have described a procedure for reacting relatively dilute solutions or dispersions of isolated soybean protein (that is to say, up to about 10% protein concentration) which have been hydrolyzed by alkaline treatment beyond the initial gel stage with carboxylic acid anhydrides, preferably $\alpha,\beta$-dicarboxylic acid anhydrides, thereby to obtain acylated soybean protein compositions which in alkaline dispersion are characterized by viscosity characteristics lower than those of unacylated soybean protein compositions which otherwise have been similarly treated. Such modified protein compositions are of surprising utility as adhesives in paper coating compositions and as components of fiber-spinning solutions.

Having described our invention, what we claim is:

1. The method of acylating isolated acid-precipitable soya protein which has been partially hydrolyzed to a state beyond the initial gel stage whereby to prepare a modified protein exhibiting lower viscosity when made into an aqueous alkaline dispersion, said process consisting of reacting carboxylic acid anhydride selected from the group consisting of acetic anhydride, propionic anhydride, benzoic acid anhydride and dicarboxylic acid anhydrides with a dilute aqueous dispersion of said isolated partially-hydrolyzed protein while continuously maintaining the reaction menstruum alkaline.

2. The method as claimed in claim 1 wherein the carboxylic acid anhydride is a dicarboxylic acid anhydride, and wherein said treatment with anhydride is carried out at temperatures between about 70° F. and 130° F.

3. The method as claimed in claim 2 wherein the carboxylic acid anhydride is an $\alpha,\beta$-dicarboxylic acid anhydride.

4. The method as claimed in claim 2 wherein the dilute aqueous dispersion of isolated protein contains between about 2% and 10% of isolated protein by weight.

5. The method as claimed in claim 1 wherein the dilute aqueous dispersion of isolated protein contains between about 2% and 10% of isolated protein by weight.

6. The method as claimed in claim 1 wherein the carboxylic acid anhydride is acetic anhydride.

7. Acylated, isolated, partially-hydrolyzed, acid-precipitable soya protein as prepared by the method of claim 1.

References Cited in the file of this patent

UNITED STATES PATENTS 2,525,792    Gordon et al. _____ Oct. 17, 1950

OTHER REFERENCES

Greenberg: Amino Acids and Proteins (Charles C. Thomas, Springfield, Illinois) (1951), pages 546–7.

Anson: Advances in Protein Chem., vol. 3, page 192 (1947), Academic Press Inc., New York.